(No Model.)

S. BELT.

COMBINED HARROW, COTTON CHOPPER, AND CULTIVATOR.

No. 347,765. Patented Aug. 24, 1886.

WITNESSES
James B. Blake
Rutledge Beale

INVENTOR
Samuel Belt
by E. H. Butler, Attorney

UNITED STATES PATENT OFFICE.

SAMUEL BELT, OF ELBERTON, GA., ASSIGNOR OF ONE-HALF TO WILLIAM C. MATTEX AND WILLIAM T. ARNOLD, BOTH OF SAME PLACE.

COMBINED HARROW, COTTON-CHOPPER, AND CULTIVATOR.

SPECIFICATION forming part of Letters Patent No. 347,765, dated August 24, 1886.

Application filed May 12, 1886. Serial No. 201,997. (No model.)

*To all whom it may concern:*

Be it known that I, SAMUEL BELT, a citizen of the United States, residing at Elberton, in the county of Elbert, State of Georgia, have invented certain new and useful Improvements in a Combined Harrow, Cultivator, and Cotton-Chopper, of which the following is a specification, reference being had therein to the accompanying drawings.

This invention relates to improvements in farming implements; and it consists in combining in one machine a harrow, cultivator, and cotton-chopper, whereby the work of the three devices is done at the same time, all as will be further explained.

Figure 1:
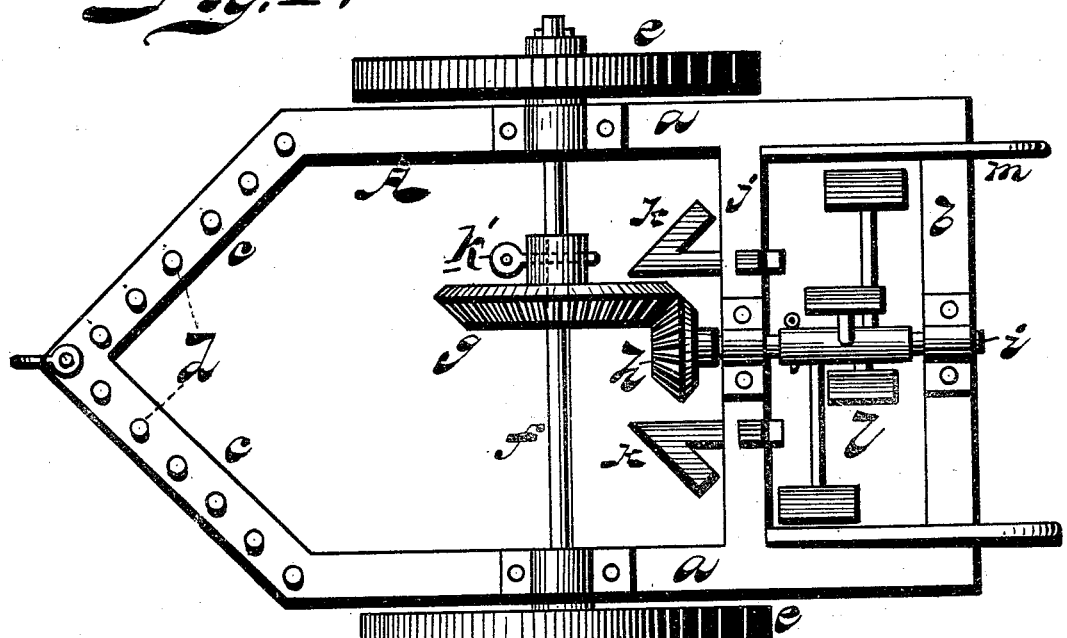
Figure 2:
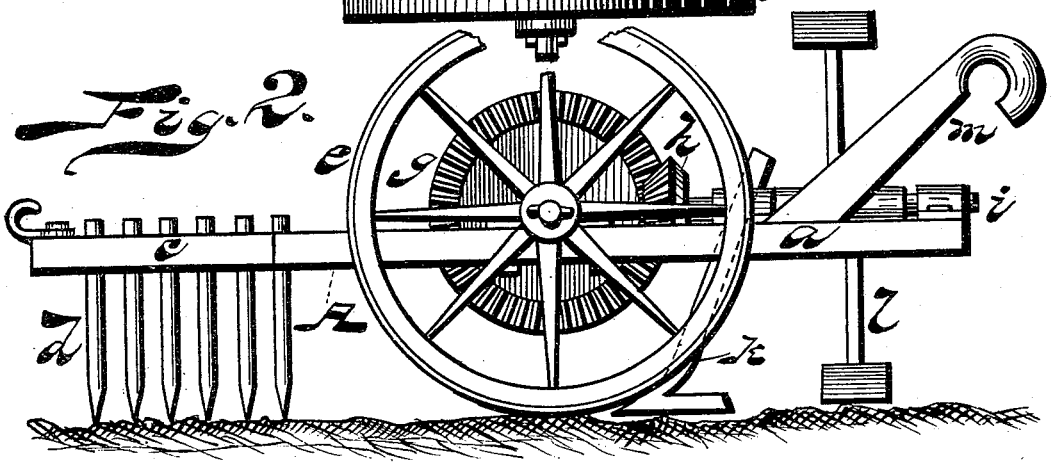

The annexed drawings, to which reference is made, fully illustrate my device, in which Figure 1 represents a plan view of my combined harrow, cultivator, and cotton-chopper; and Fig. 2 is a side view of the same.

Referring by letter to the accompanying drawings, A designates the frame of the machine, consisting of the side bars, $a$, transverse rear bar, $b$, and front oblique bars, $c$, which carry the harrow-teeth $d$. This frame is, in fact, a harrow-frame formed entire, and the bars constituting which are all in the same horizontal plane. It can therefore be readily cast, leaving no joints to work loose, and when so made it is very light and rigid, and at the same time peculiarly useful for bearing the several devices hereinafter explained.

The frame is supported on transporting-wheels $e$, the axle $f$ of which is provided with a beveled gear-wheel, $g$, which engages a beveled pinion, $h$, on a shaft, $i$, journaled in bearings on the main frame, and cross-bar $j$, which latter carries the cultivators or sweeps $k$, arranged in front of the choppers $l$, fixed to the revolving shaft $i$, and with which they revolve. The axle $f$ is square between the side bars, $a\,a$, of the frame A, to prevent the wheel $g$ from turning around it, and a pin or key, $k$, is used to hold the wheel $g$ in gear with the pinion $h$. By removing pin $k'$ the wheel $g$ can be disengaged from pinion $h$, and the chopper thrown out of action.

Handles $m$ are secured to the frame for guiding the machine, and the team is hitched to the front or harrow portion.

It will be seen that a device constructed as herein described and shown first harrows the ground, and behind which the sweeps come into play, and then finally the choppers, all of which being accomplished at one time.

I am well aware that it is not new to combine in a single frame mounted on transporting-wheels, teeth and choppers and scrapers or cultivator-teeth, and I do not broadly claim such combination as my invention.

Having described my invention, what I claim is—

The combination of a harrow-frame formed of side bars, $a\,a$, rear cross-bars, $b\,j$, and oblique bars $c\,c$, cast entire and mounted on transporting-wheels, the square axle $f$, the bevel-wheel thereon, adjustable as described, the bevel-pinion $h$, rotary chopper $l$ on an axle journaled centrally on the two rear cross-bars $a\,a$, the sweeps $k$ in the rear of axle $f$ and the front of the choppers, and harrow-teeth inserted through the front oblique bars of frame A, all as shown and described.

In testimony whereof I affix my signature in presence of two witnesses.

SAMUEL X BELT.
his mark.

Witnesses:
GEO. L. WHITE,
R. M. WILLIS.